UNITED STATES PATENT OFFICE 2,564,927

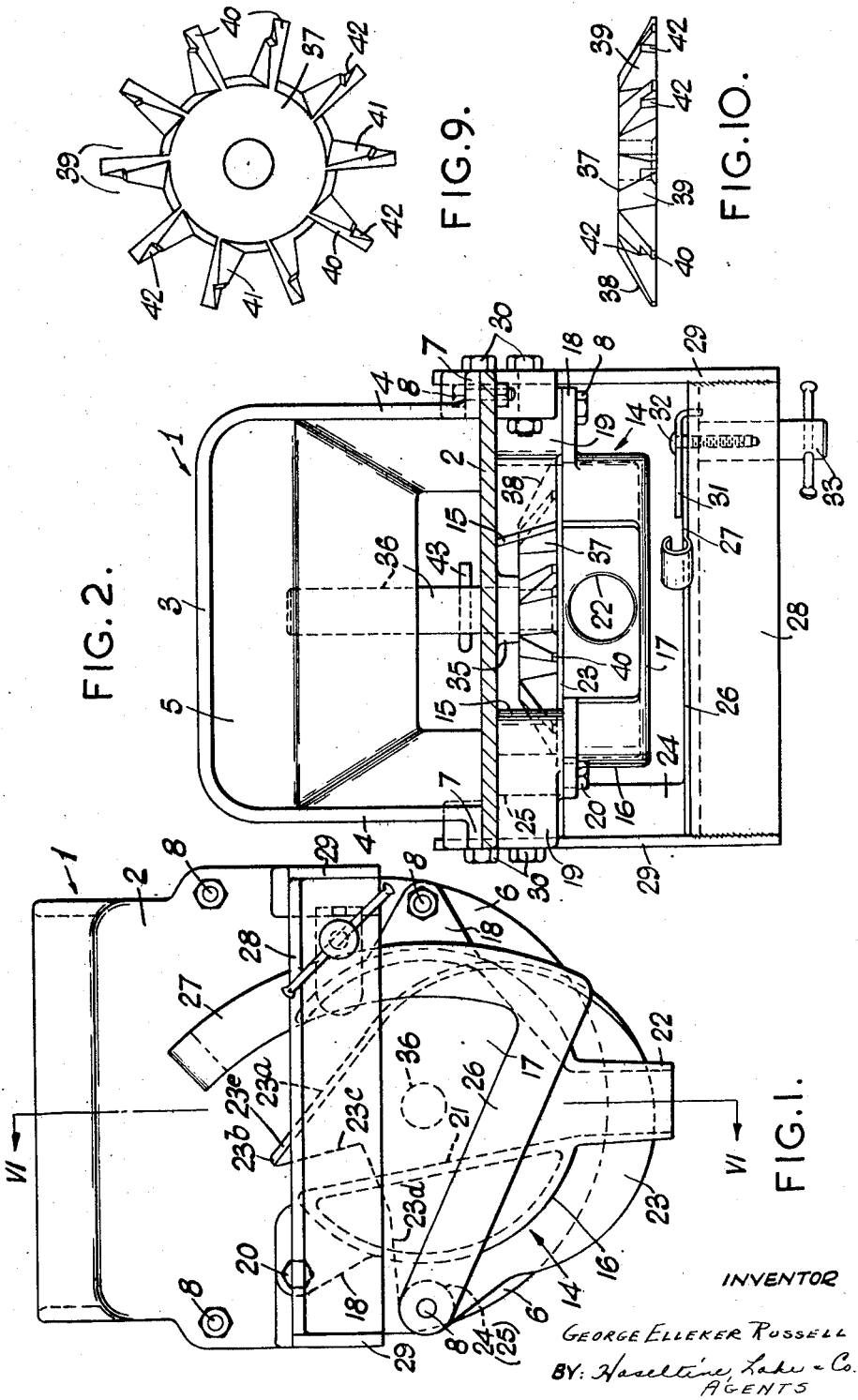

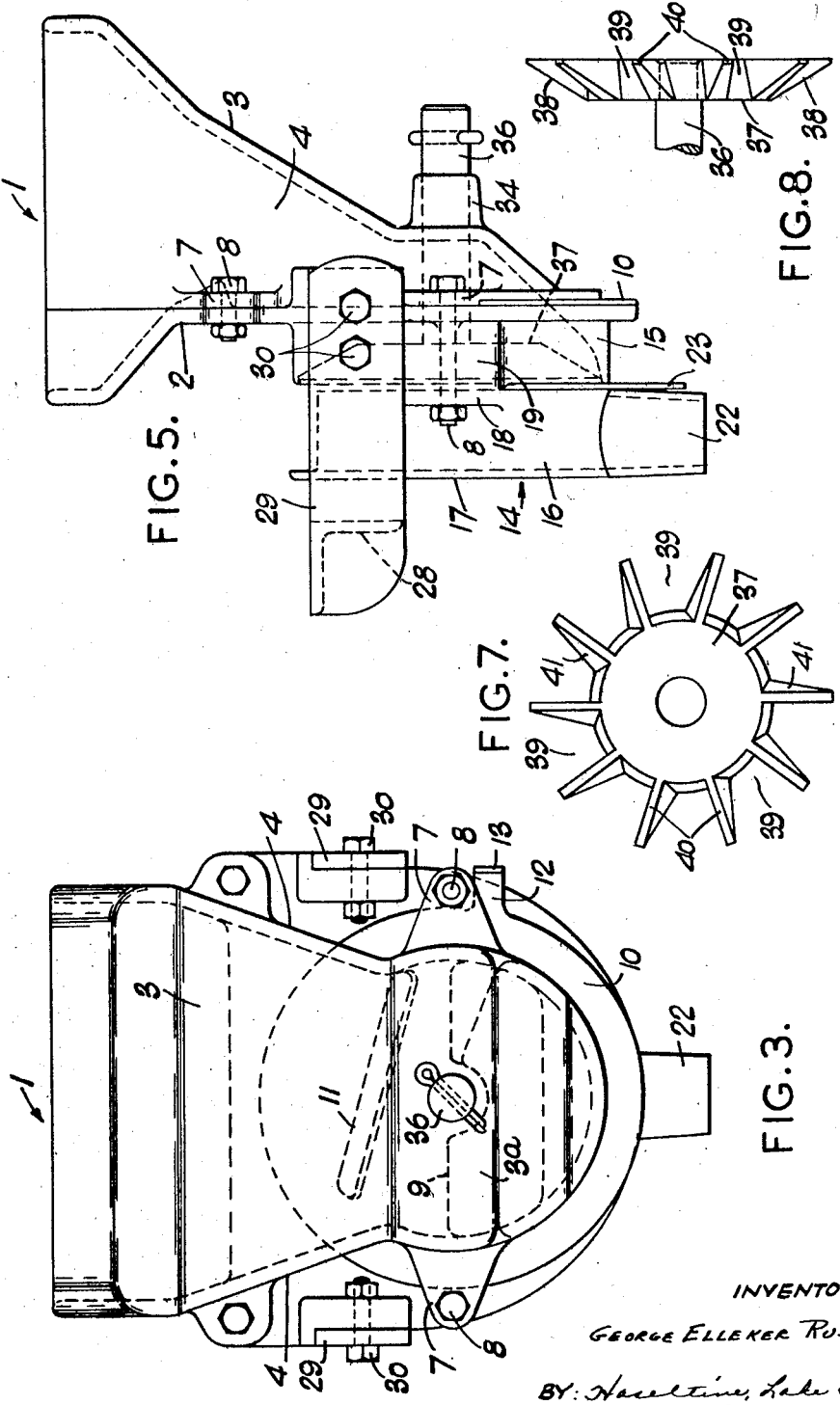

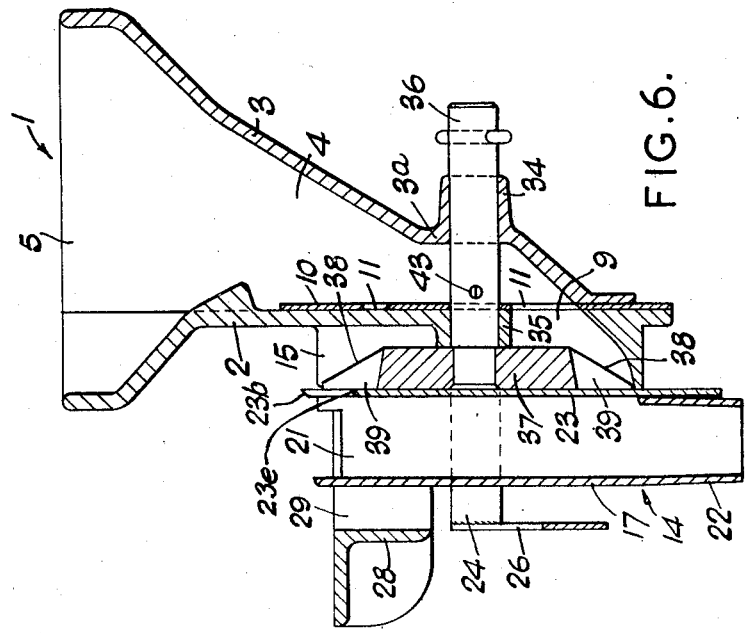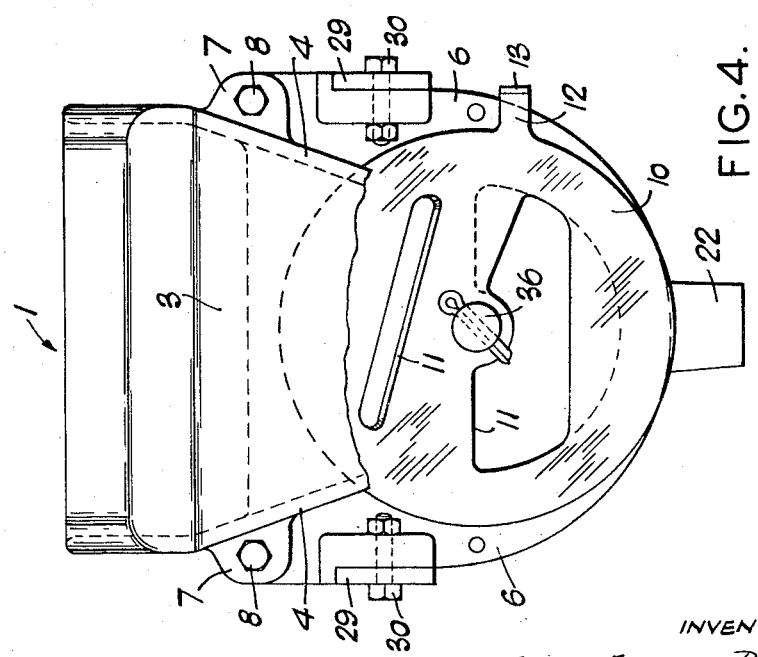

SOWER WITH SEED DISPENSING ROTOR, AN ADJUSTABLE SPILL PLATE, AND MEANS FOR ACCOMMODATING SEEDS OF DIFFERENT SIZES

George Elleker Russell, Kirbymoorside, England, assignor to Russell's (Kirbymoorside) Limited, Kirbymoorside, England Application March 12, 1949, Serial No. 81,170
In Great Britain July 1, 1948

8 Claims. (Cl. 222—227)

The invention relates to seed-sowing devices, the object of the invention being to provide a device which is of simple construction, is capable of delivering the seeds evenly and at the desired intervals without fear of crushing and is readily adaptable for dealing with seeds of a variety of sizes and shapes, such as the seeds of peas, beetroot, mangold and turnip, without the necessity for inter-changing parts.

Broadly speaking, the device according to the invention comprises a box into the bottom part of which a mass or body of the seeds to be sown is supplied from a hopper, the box containing a pivotally mounted and rockably adjustable spill plate and a rotor which is adapted to be rotated in contact with the spill plate and is provided with at least one peripherally disposed recess into which a quantity of the seeds at the bottom of the box passes when the rotor is rotated, the spill plate being so designed as to close a side of the recess when the latter is at the bottom of the box and to open the said side when the recess reaches an elevated position as the result of rotation of the rotor, thereby allowing seeds to fall out of the recess in the direction of the spill plate and to pass to the ground.

Means may be provided for controlling the depth of the mass of seeds supplied to the bottom part of the box from the hopper.

An embodiment of the invention is illustrated in the accompanying drawings, in which:

Figure 1 is a front elevational view of the device;

Figure 2 is a plan view partly in section;

Figure 3 is a rear elevational view;

Figure 4 a rear elevational view partly broken away;

Figure 5 is a side elevational view;

Figure 6 a sectional view on the line VI—VI of Figure 1;

Figures 7 and 8 are respectively a face view and an edgewise view of the rotor, and Figures 9 and 10 are similar views of a modified form of rotor.

As illustrated, the device comprises a hopper which is generally indicated at 1 and is formed with a front wall 2, a rear wall 3, side walls 4 and an open top 5. The rear wall 3 slopes downwardly towards the front wall 2, to merge into a vertical portion 3a, whence the rear wall again slopes downwardly to meet the front wall 2 at the bottom. The side walls 4 converge towards each other in the downward direction and are curved at the bottom so as to join.

The front wall 2 of the hopper is extended laterally of the side walls 4 to form flanges 6, the rear wall 3 and side walls 4 being made in one piece and provided with lugs 7 which butt against the front wall and are held to the latter by means of bolts 8.

The lower part of the front wall 2 of the hopper is provided with an opening 9 (Figures 3 and 6) through which seeds can pass from the interior of the hopper. Against the inner face of the front wall 2 there lies a rotatably adjustable disc 10 the lower part of which extends through a gap provided between the front wall and the part of the hopper constituted by the walls 3 and 4, so that this part is exposed at the outside. The disc 10 is formed with two approximately oppositely disposed apertures 11 of different sizes and shapes, either one of which, on rotation of the disc, can be brought more or less into register with the opening 9, thereby varying the effective size of the opening and regulating the quantity of seed passing through it from the interior of the hopper. To facilitate rotation, the exposed portion of the disc 10 is provided with a radially disposed extension 12 bent to form a finger-piece 13 (Figures 3 and 4).

To the outer face of the front wall 2 of the hopper 1 there is applied a box generally indicated at 14. The box is of substantially cylindrical shape and is made up of two parts, namely, a circular rib 15 formed integrally with the front wall 2 and projecting from the outer face thereof, and a drum. The rib extends round the curved lower edge of the opening 9 in the front wall 2 and is interrupted at the top and the drum is formed with a circular side wall 16 corresponding to the rib 15 and similarly interrupted at the top, and a front wall 17. The side wall 16 of the drum is provided with lugs 18 which bear against lugs 19 on the rib 15 and are held thereto by one of the bolts 8 and by a further bolt 20. With the drum applied to the container, the interruptions at the top of the rib 15 and side wall 16 respectively, together provide an opening at the top of the box 14.

Inwardly of the left-hand side of the side wall 16 of the drum, there is provided a web 21 (Figures 1 and 6) which extends from the corresponding upper edge of the wall downwardly to an outlet spout 22 formed in the bottom of the drum.

The box 14 accommodates a rockably adjustable spill plate 23 which is arranged between the rib 15 and the side wall 16 of the drum, the lower marginal part of this plate extending through a gap provided between the said rib and wall. The spill plate is in the form of a disc with a curved lower edge which passes from the outside of the box 14, through the gap between the rib 15 and wall 16, to the interior of the box. As the curved edge enters the box it develops into a straight portion 23a (Figure 1) which is inclined upwardly and to the left and ends in a point 23b. From this point the disc is cut downwardly as indicated at 23c and then outwardly to form a shoulder 23d. The straight portion 23a and a portion of the curved part of the edge of the disc adjacent the straight portion are chamfered as indicated at 23e for sharpness, the chamfer being provided on the outer face of the disc, that is to say, the face remote from the hopper 1.

To provide for the rockable adjustment of the spill plate 23, the portion thereof adjacent the shoulder 23d and exposed at the outside of the box 14, is provided with a bushing 24 lying in axial alignment with one of the bolts 8 which serve to secure the two parts of the hopper together, the bolt passing through the flange 6 and into the bushing 24 so as to act as a bearing pin upon which the bushing 24 and the spill plate are pivotally mounted. A screw-threaded collar 25 is engaged with the bolt between the flange 6 and spill plate 23 and acts as a distance piece while enabling the bolt to be tightened to assist in clamping the two parts of the hopper together. The outer end of the bushing 24 carries a quadrant lever adapted to be operated by hand, the lever having a straight arm 26 which extends across the end wall 17 of the drum but is spaced therefrom and which terminates in an upwardly extending curved arm 27 struck from a radius having its centre at the axial centre of the bushing 24. The curved arm 27 of the quadrant lever lies against the inner face of a cross-bar 28 forming part of a U-shaped bracket the side arms 29 of which are secured to the front wall 2 of the hopper 1 by means of bolts 30. On the inner face of the cross-bar 28 there is provided a clamping plate 31 supported by a screw 32 passing through the bar to the outside, the shank of the screw being engaged by a nut 33 adapted for operation by hand. On the nut being tightened, the clamping plate 31 will be drawn into close engagement with the curved arm 27 of the quadrant lever and thus press the latter into frictional engagement with the cross-bar, thereby holding the lever against movement for rocking the spill plate 23.

The vertical part 3a of the back wall 3 of the hopper 1 is formed with an outwardly extending boss 34 and the front wall 2 of the hopper is formed with a forwardly extending boss 35, the two bosses being provided with aligned holes providing bearings for a rotatable spindle 36 which extends from the outside, through the lower part of the hopper 1 and into that portion of the box 14 defined by the rib 15 on the outer face of the front wall of the hopper. The bearings for the spindle 36 are co-axial with the axis of the rib 15, which axis is located above the outlet 9. A clearance hole in the centre of the rotatable disc 10 provides free passage for the spindle 36 therethrough so that the disc is not influenced by rotation of the shaft, although the spindle provides a centre of rotation for the disc. The spindle carries at its inner end a rotor 37 co-axial with the drum of the box 14, the rotor being secured for rotation with the spindle and the front face of the rotor bearing closely against the back face of the spill plate 23. The rotor is of a diameter slightly less than the internal diameter of the box 14 so that, while its peripheral edge lies closely against the curved interior surface of the rib 15, it is free to rotate. The rotor may be maintained in close contact with the spill plate by means of a helical compression spring (not shown) arranged around the spindle 36 and acting between the front face of the wall 2 of the hopper 1 and the rear face of the rotor. Any tendency for the rotor to cause a rocking of the spill plate by reason of its pressure upon the latter, is inhibited by reason of the fact that the spill plate is a reasonably tight fit in the gap between the rib 15 and the side wall 16 of the drum, and by reason also of the gripping effect of the clamping plate 31 when this is in operation.

The rear face of the rotor is chamfered as indicated at 38 so that the rotor is narrower at its periphery than at its centre. A plurality of recesses 39 are provided in the periphery of the rotor, these recesses extending through the thickness of the rotor and being separated by radially extending partitions 40 so that the rotor takes substantially the shape of a toothed wheel. As the rotor is rotated, seeds in the lower portion of rib 15 adjacent the aperture 9 and constituting the lower portion of the box 14 nearest the hopper 1, find their way into the recesses 39 and are carried up by the partitions 40. The spill plate 23 is so dimensioned that when the straight arm 26 of the quadrant lever is in an approximately horizontal position, the point 23b of the spill plate will project out of the opening in the top of the box 14 and the chamfered straight part 23a will also lie exposed with a slight inclination to the right. This position is determined by engagement of the shoulder 23d with part of the box and results in the spill plate acting to close the outer sides of all the recesses 39 so that seeds passing into the recesses from the mass of seeds in the bottom of the box 14 cannot fall out of the recesses in the direction of the spill plate. By depressing the quadrant lever by downward pressure on the curved arm 27 thereof, the spill plate will be rocked downwardly about its pivotal point with the result that the chamfered edge 23a of the spill plate will descend into the box 14 and assume a greater angle of inclination, thereby opening or partly opening the outer sides of the recesses 39 near the top of the rotor. Under these conditions, when, as a result of rotation of the rotor in an anti-clockwise direction (view from the front of the box 14), a recess 39 reaches the edge 23a of the spill plate, the outer side of this recess will become more or less exposed, leaving the seeds free to fall out of the recess, over the said edge of the spill plate, and into the drum portion 17 of the box 14, the seeds then dropping through the outlet spout 22 whence they are conducted to the ground by a tube or chute (not shown).

To promote a proper lifting of the seeds by the partitions 40 of the rotor 37 and to ensure that they will fall out of the recesses 39 in the direction of the spill plate 23 as the recesses reach the cut-away portion of the latter, the walls of the partitions facing the direction of rotation of the rotor are, as indicated at 41 in Figures 7 and 9, arranged in a plane which provides an acute angle between the said walls and the inner face of the spill plate against which the rotor bears.

Lifting of the seeds by the rotor partitions, especially where the seeds are small and require to be thinly distributed, can be further promoted by providing recesses or pockets 42 in the angled faces 41 of the partitions 40 as indicated in Figures 9 and 10, these recesses or pockets being arranged at the outer extremities of the partitions.

By rockably adjusting the spill plate 23 by means of its quadrant lever 26, 27, thereby varying the position of the chamfered edge portion 23a in relation to the upper part of the rotor 37, different spillage effects can be produced according to the type of seed to be distributed. The curved arm 27 of the quadrant lever may be provided with graduations (not shown) any one of which, on being brought into register with the top edge of the cross-bar 28, will serve to indicate the setting of the spill plate according to the kind of seed to be sown.

To promote movement of the seeds from the hopper 1, through one of the apertures 11 in the disc 10 and thence through the opening 9 in the front wall 2 of the hopper 1, into the adjacent part of the box 14, the portion of the spindle 36 extending through the hopper is provided with a radially projecting pin 43 (Figures 2 and 6) which, on rotation of the spindle, agitates, the seeds in the hopper and thus ensures their transfer to the box 14.

The hopper may be provided with a lid (not shown) and suitably disposed openings with cover plates (not shown) may be provided to facilitate removal from the appliance of any seeds left over after a drilling operation.

Any suitable means may be provided for rotating the spindle 36. In the embodiment illustrated, the part of the spindle exposed at the back of the hopper is provided with a cross-pin 44 with which the end of a driving shaft (not shown), may be engaged.

I claim:

1. A seed sowing device comprising a hopper having front and rear walls with an opening in the lower part of the front wall, a box applied to the hopper over the said opening and consisting of a circular rib with an interruption at the top in combination with a drum having a front wall and a side wall which is also interrupted at the top and has an outlet opening at the bottom, a pivotally mounted and rockably adjustable spill plate interposed between said rib and drum, bearings in the front and rear walls, said bearings being co-axial with the axis of the circular rib, which axis is located above said outlet opening, a shaft rotatable in said bearings, and a rotor secured to said shaft and mounted co-axially with the drum, said rotor being of a diameter slightly less than the diameter of the inner surface of said circular rib and located against the rear face of the said spill plate, and said rotor being provided with at least one peripherally located recess which, when disposed at the lower portion of said circular rib, receives seeds from a mass supplied to said portion through the opening in the hopper, said spill plate being in the form of a disc with a curved lower edge which develops into a straight portion, the lower part of the spill plate being such as to close the outer side of said recess of the rotor and the spill plate being adjustable into a position in which the straight portion is inclined upwardly to expose the said side when the recess is in an elevated position so that the seeds can fall out of the recess into the drum.

2. A seed sowing device according to claim 1, wherein a plate is mounted for rotatable adjustment about said shaft and is disposed and dimensioned so as to cover said outlet opening, said plate having two diametrically, oppositely disposed apertures, so located that, upon adjustive rotation of said plate about said shaft either aperture can be brought selectively into registry with said outlet opening.

3. A seed sowing device according to claim 1, wherein the said curved lower edge of the spill plate passes from the outside of the box through a gap between the circular rib and the side wall of the drum, and wherein the straight portion of the disc is inclined upwardly to a point, whereafter the edge extends downwardly and then outwardly.

4. A seed sowing device according to claim 3, wherein the said straight portion of the edge of the disc and a portion of the curved part of the edge are chamfered.

5. A seed sowing device according to claim 1, wherein the spill plate is provided with a quadrant lever having a curved arm cooperating with a clamping plate.

6. A seed sowing device according to claim 1, wherein the rotor has a plurality of peripherally arranged recesses extending through the thickness of the rotor and separated by radially extending partitions, the walls of the partitions, facing the direction of rotation of the rotor, being arranged in a plane providing an acute angle between said walls and the inner face of the spill plate.

7. A seed sowing device according to claim 6, wherein pockets are provided in the outer extremities of the angled faces of the partitions.

8. A seed sowing device according to claim 1, wherein the spindle is provided with means for agitating the seeds in the hopper.

GEORGE ELLEKER RUSSELL.

REFERENCES CITED

The following references are of record in the file of this patent:

UNITED STATES PATENTS

| Number | Name | Date |
|---|---|---|
| 936,170 | Rulison | Oct. 5, 1909 |
| 989,348 | Haines | Apr. 11, 1911 |
| 1,300,441 | Marsa | Apr. 15, 1919 |
| 1,397,689 | Krotz | Nov. 22, 1921 |
| 1,474,599 | Martin | Nov. 20, 1923 |
| 1,480,963 | Sproull | Jan. 15, 1924 |
| 1,549,670 | Kort, Jr. | Aug. 11, 1925 |
| 2,044,326 | Pickell | June 16, 1936 |
| 2,054,552 | Wakeham | Sept. 15, 1936 |
| 2,207,822 | Rooney et al. | July 16, 1940 |